Figure 1:
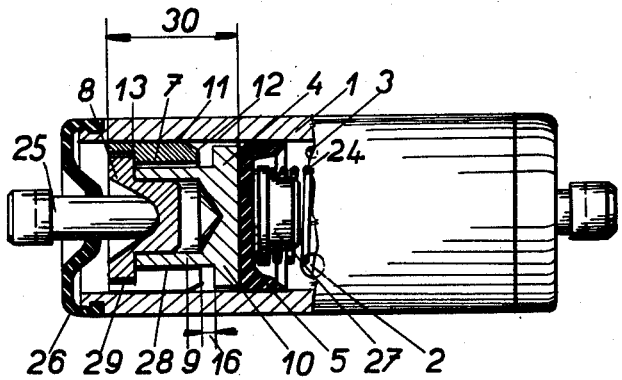

Oct. 25, 1960 — A. NAHODIL — 2,957,551
APPARATUS FOR EFFECTING AUTOMATIC ADJUSTMENT OF THE
CLEARANCE BETWEEN THE BRAKE LINING AND THE BRAKE
FRICTION SURFACE IN FLUID OPERATED BRAKES
Filed Oct. 31, 1957 — 2 Sheets-Sheet 2

INVENTOR.
Antonín Nahodil

United States Patent Office 2,957,551
Patented Oct. 25, 1960

2,957,551

APPARATUS FOR EFFECTING AUTOMATIC ADJUSTMENT OF THE CLEARANCE BETWEEN THE BRAKE LINING AND THE BRAKE FRICTION SURFACE IN FLUID OPERATED BRAKES

Antonin Nahodil, Prague, Czechoslovakia, assignor to Zapadoceske autodruzstvo, Plzen, Czechoslovakia Filed Oct. 31, 1957, Ser. No. 693,610

Claims priority, application Czechoslovakia Nov. 7, 1956

5 Claims. (Cl. 188—71)

This invention relates to an apparatus for effecting automatic adjustment of the clearance between the brake lining and the brake friction surface in fluid operated brakes of motor vehicles.

Various apparatus for the automatic adjustment of the clearance in fluid operated brakes are already known. Such apparatus comprises a brake cylinder, a retracting spring for returning the brake elements to inoperative position, expansion pistons mounted for sliding movement in the brake cylinder and operatively connected with the brake elements, frictional adjustment means formed by an expansion ring mounted in the brake cylinder and retained in adjusted position in the cylinder by friction, groove defining means on the piston receiving the expansion ring, the faces of said groove allowing movement in axial direction of the piston to said expansion ring through a clearance sufficient only for the disengagement of the cooperating brake elements, the frictional resistance retaining said adjustment means in position in the cylinder being greater than the force produced by the pressure of the braking fluid during the braking operation.

These known apparatus have certain disadvantages. One of these disadvantages consists therein that after a certain time of service the friction surfaces of the adjustment means are worn out, thus reducing not only the life time but also the reliability of working of the apparatus.

It is an object of the present invention to prolong the life time and to increase the reliability of working and to simplify the design of such apparatus.

The apparatus for effecting automatic adjustment of the clearance between the brake lining and the brake friction surface in fluid operated brakes according to the present invention consists substantially therein that the expansion piston is in the direction to the inside of the brake cylinder provided with a guide head to which in the direction to the outside a cylindrical neck piece and a guide lug is annexed and that the expansion ring inserted into the space round the cylindrical neck piece has such a width that it extends at least over half the length of the expansion piston. Between the inner surface of the expansion ring and the outer surface of the neck piece a clearance is preferably provided for avoiding any metallic contact between these parts. The head of the guide lug may slide either on the surface of an annular inner recess provided at the outer end of the expansion ring or respectively the outer end of the cylindrical neck piece of the expansion piston may slide directly on the end portion of the expansion ring, in the latter case the radial clearance between the neck piece and the expansion ring being obtained by increasing the internal width of the expansion ring.

The drawings illustrate by way of example embodiments of the apparatus according to the present invention.

Figure 2:
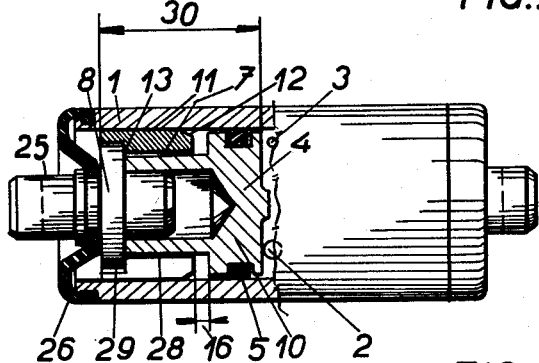
Figure 3:
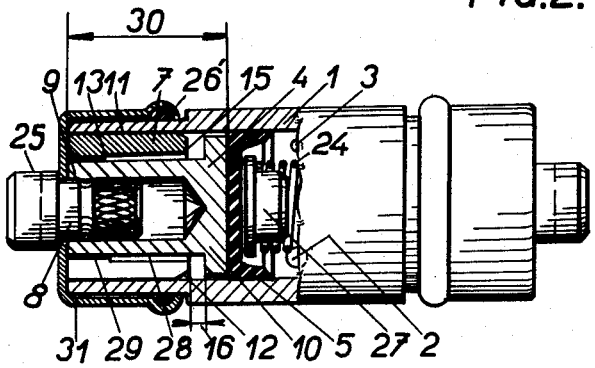
Figure 4:
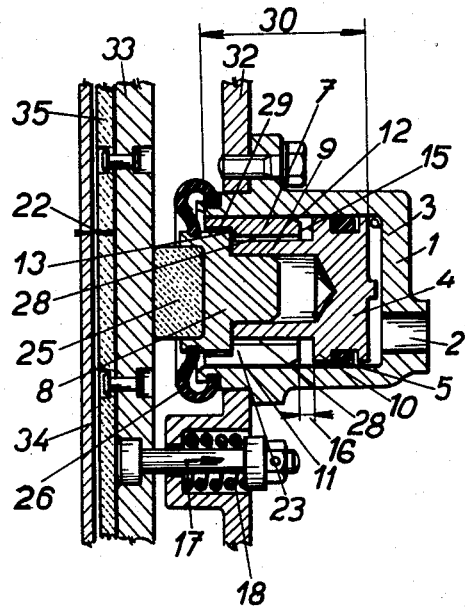
Figure 5:
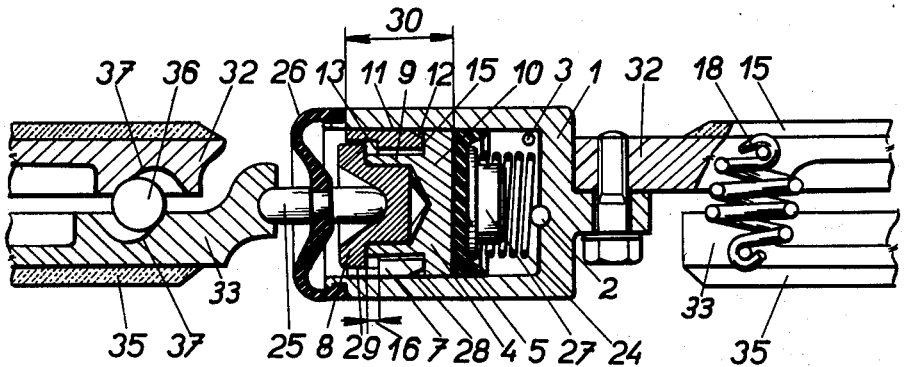

Fig. 1 shows an embodiment of the apparatus used in a bilateral brake cylinder in the position corresponding to released brake elements, partly in longitudinal section and partly in a side-view, Figs. 2 and 3 show two other embodiments in a similar section and view, Fig. 4 illustrates a single-end brake cylinder for an automatically adjustable directly acting disc brake in the position corresponding to released braking elements and Fig. 5 a single-end brake cylinder for an automatically adjustable disc brake with a distensible disc in the position corresponding to maximum braking.

In the example shown in Fig. 1 the expansion ring 7 having a width of more than half the length 30 of the expansion piston 4 including its guide lug 8 is with prestress inserted into the bore of the brake cylinder 1 and retained therein by friction with its outer surface 11. The expansion ring is allowed to move in the annular recess of the expansion piston 4 in the axial direction within the range of the clearance 16 against the force of the friction of its outer surface on the inner surface of the brake cylinder 1. The clearance 16 allows also for the deformation of the elements of the brake mechanism due to the elasticity and thermal expansion of the material. A clearance 28 in the radial direction is provided between the expansion ring 7 and the expansion piston 4 in order to avoid any metallic contact between the cylindrical neck piece 9 of the expansion piston 4 and the expansion ring 7. The edges of the frictional surface of the expansion ring 7 are bevelled or rounded off at 12. The expansion ring 7 extends in the longitudinal direction of the brake cylinder 1 over the major part of the annular recess adjacent to the head 10 of the expansion piston 4 within the length of the neck piece 9. The guide lug 8 provided with a head is connected to the expansion piston 4, the latter thus consisting of two parts 4 and 8. This enables an easy insertion of the expansion ring 7 into the recess of the expansion piston 4, the parts 4, 7 and 8 forming after their assembly an interchangeable unit which can be quickly inserted into the brake cylinder 1. The head 10 of the expansion piston 4 can easily slide in the bore of the brake cylinder 1. The cylindrical neck piece 9 of the expansion piston 4 may be connected to the guide lug 8 in any convenient manner. A dish-shaped packing 5 bears against the head 10 of the expansion piston 4 adjacent to the inner side of the brake cylinder 1. The dish shaped packing 5 is supported by plates 27 which are under the action of a spring 24. Whilst—as mentioned before—there is a radial clearance between the neck piece 9 of the expansion piston 4 and the expansion ring 7, the expansion piston 4 is in the axial direction precisely guided in the bore of the cylinder 1 by means of its head 10 and also the guide lug 8 of the expansion piston fits with its head precisely into the annular recess 29 of the expansion ring 7. The guide lug 8 has on its outer side a cavity for the thrust rod 25. The brake cylinder 1 is protected against dust by a cap 26. The braking fluid enters the brake cylinder 1 by a channel 2 and the pressure chamber is deaerated through the opening 3.

In the embodiment shown in Fig. 2 the expansion piston has a ring-shaped packing 5. In this embodiment having certain advantages over the dish-formed packing according to Fig. 1, no spring 24 and supporting plates 27 are required and the guide lug 8 of the expansion piston 4 has a rod-like extension 25 so that no special thrust rod is needed.

The embodiment according to Fig. 3 differs from the construction shown in Fig. 1 therein that the outer end of the cylindrical neck piece 9 of the expansion piston 4 slides directly in the outer end portion 29 of the expansion ring 7 and the radial clearance 28 between the neck piece 9 and the expansion ring 7 is formed by increasing the internal width of the expansion ring 7. The face of a dust protection cap 31 is clamped between the expansion piston 4 and the guide lug 8, the jacket of the said cap provided with a strike-off ring 26' moving together with the expansion piston 4 and the guide lug 8 along the smoothed outer surface of the brake cylinder 1. The guide lug 8 has an extension 25 which transmits the movements of the expansion piston 4 directly to the brake shoe. 15 denotes the inner face of the expansion ring 7.

Fig. 4 represents an embodiment of the apparatus according to the invention applied to an automatically adjustable disc brake. The brake cylinder 1 is by means of a front-end flange mounted on the disc brake support 32. Inside the brake cylinder 1 is the expansion piston 4, the expansion ring 7 and the guide lug 8, these parts forming the adjusting apparatus tightened by the packing ring 5. The thrust rod is in this embodiment replaced by a thrust block 25 placed between the expansion piston 4 with guide lug 8 and the disc 33 with brake lining 35, the block 25 being made of heat resistant and heat insulating material. The thrust block is fixed in a recess of the guide lug 8. The movable disc 33 is returned to the support 32 to inoperative position by the retracting spring 18, the disc 33 being permanently pressed to the block 25 and the outer leading edge 13 of the expansion ring 7 forming an adjustable stop for the movement of the expansion piston 4 in the inoperative position of the brake. 15 denotes the inner face of the expansion ring 7, 17 the retracting force of the spring 18, 22 the clearance between the movable disc 33 or its brake lining 35 respectively and the rotary disc 34, and 23 the cross slit of the expansion ring 7.

Fig. 5 illustrates the adjusting apparatus mounted in a single-end brake cylinder 1 applied by way of example to a disc brake with a distensible disc. The drawing shows the apparatus in the phase of maximum braking just at the moment when a new adjustment takes place. The brake cylinder 1 is rigidly fixed to one half 32 of the disc, whilst the thrust rod 25 bears against the second half 33 of the disc. During braking the thrust rod 25 is forced to the outside by the pressure of the fluid, the disc halves 32, 33 being thus relatively displaced in radial direction. For distending the two halves 32, 33 of the disc in order to force the brake lining 35 against the rotary disc, both halves 32, 33 have inner deepenings 37 wherein a ball 36 is seated. The retracting spring 18 returns the disc halves 32, 33 to inoperative position. During braking the disc halves 32, 33 are mutually displaced in radial direction and distended by the cooperation of the bevelled surfaces of the deepenings 37 and the ball 36. When applying the apparatus according to the invention to this known type of disc brakes the hitherto used complicated contrivances may be omitted and the adjusting device may be subsequently inserted into these disc brakes as it can be inserted into drum brakes with brake shoes.

I claim:

1. An apparatus for effecting automatic adjustment of the clearance between the brake lining and the brake friction surface in fluid operated brakes comprising a brake cylinder, a retracting spring for returning the brake elements to inoperative position, at least one expansion piston mounted for sliding movement in the brake cylinder and operatively connected with the brake elements, frictional adjustment means formed by an expansion ring mounted in the brake cylinder and retained in adjusted position in the cylinder by friction, groove defining means on said piston receiving the expansion ring and having radially directed faces which are axially spaced apart by a distance greater than the axial width of said expansion ring in said groove to allow movement in axial direction of the piston with respect to said expansion ring through a clearance sufficient only for the disengagement of the cooperating brake elements, the frictional resistance retaining said expansion ring in position in the cylinder being less than the force produced by the pressure of the braking fluid during the braking operation and greater than the force produced by said retracting spring, said expansion piston including a guide head at the end of the piston facing toward the inside of said brake cylinder, a cylindrical neck piece extending from said guide head toward the other end of the piston and a guide lug secured to said neck piece, the expansion ring extending around the cylindrical neck piece with said guide head defining one of said radially directed faces of the groove, said axial width of the expansion ring being at least more than one-half the axial length of said expansion piston, and said expansion ring having an inner diameter greater than the outer diameter of said neck piece to provide a clearance therebetween for avoiding any metallic contact between the expansion ring and neck piece, said guide having a head thereon defining the other radially directed face of said groove, and said expansion ring having an end portion with an enlarged bore slidably receiving said head of the guide lug.

2. An apparatus as in claim 1; further comprising a disk-shaped packing held against said guide head of the expansion piston and engaging the interior surface of said brake cylinder for sealing said piston with respect to said brake cylinder.

3. An apparatus as in claim 1; wherein said guide head of the expansion piston has an annular, radially outward opening groove therein, and further comprising a packing ring in said groove of the guide head and engaging the interior surface of said brake cylinder for providing a seal between the expansion piston and the brake cylinder.

4. An apparatus as in claim 1; wherein the brake elements include an axially movable disc carrying the brake lining and a rotatable disc which is axially fixed with respect to a support and defines said brake friction surface; and wherein said brake cylinder is mounted on said support and has a single expansion piston therein with said guide lug of the latter being directed toward said movable disc; and further comprising a thrust block of heat resistant material interposed between said guide lug and said movable disc.

5. In an automatically adjusting brake arrangement, in combination, a brake cylinder; a brake piston reciprocable in said cylinder for braking movement and for return movement; a conduit communicating with said cylinder for admitting fluid thereto under pressure so as to actuate the braking movement of said piston; means for actuating the return movement of said piston; a stepped annular stop member having an axially extending friction face frictionally secured to said cylinder, an abutment face on a terminal radial surface of said stop member, and another abutment face on a radial step surface of said stop member, said abutment faces being axially spaced from each other and facing in opposite directions; first abutment means on said piston for abutment against one of said abutment faces during braking movement of said piston for moving said stop means in the direction of said braking movement; and second abutment means on said piston for abutment against the other one of said abutment faces during return movement of said piston for limiting said return movement, the axial length of said friction face being greater than the axial spacing of said abutment faces.

References Cited in the file of this patent

UNITED STATES PATENTS

| | | |
|---|---|---|
| 1,755,830 | Loughead | Apr. 22, 1930 |
| 2,161,640 | Schnell | June 6, 1939 |
| 2,357,041 | Hawley | June 13, 1944 |
| 2,358,740 | Scott-Iverson | Sept. 19, 1944 |
| 2,497,815 | Frick | Feb. 14, 1950 |
| 2,555,651 | Lambert et al. | June 5, 1951 |
| 2,754,936 | Butler | July 17, 1956 |

FOREIGN PATENTS

| | | |
|---|---|---|
| 203,217 | Australia | Aug. 27, 1956 |
| 711,405 | Great Britain | June 30, 1954 |